US 8,975,540 B2

(12) United States Patent
Mareno et al.

(10) Patent No.: US 8,975,540 B2
(45) Date of Patent: Mar. 10, 2015

(54) ELECTRONIC DEVICES WITH SUPPORT FRAMES AND MECHANICALLY-BONDED PLASTIC AND METHODS FOR FORMING SUCH ELECTRONIC DEVICES

(75) Inventors: Jason Donald Mareno, Raleigh, NC (US); Bart Peter Reier, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 384 days.

(21) Appl. No.: 13/329,460

(22) Filed: Dec. 19, 2011

(65) Prior Publication Data
US 2013/0155627 A1  Jun. 20, 2013

(51) Int. Cl.
*H01R 13/502* (2006.01)
(52) U.S. Cl.
USPC ........... 174/559; 174/560; 174/561; 174/563; 361/679.55; 361/679.56; 361/807
(58) Field of Classification Search
CPC ...... G06F 1/1613; G06F 1/1626; G06F 1/181
USPC .............. 361/679.55, 679.56, 807; 174/50.5, 174/50.51, 50.62, 50.63, 520, 521, 522, 174/524, 535, 536, 537, 559, 560, 561, 563
See application file for complete search history.

(56) References Cited

U.S. PATENT DOCUMENTS

| 6,437,238 | B1 | 8/2002 | Annerino et al. | |
| 7,755,885 | B2 * | 7/2010 | Huang | 361/679.3 |
| 7,796,381 | B2 * | 9/2010 | Zuo et al. | 361/679.57 |
| 8,049,120 | B2 * | 11/2011 | Prest et al. | 174/535 |
| 8,199,488 | B2 * | 6/2012 | Zou et al. | 361/679.55 |
| 8,587,935 | B2 * | 11/2013 | Lee | 361/679.02 |
| 2009/0017242 | A1 | 1/2009 | Weber et al. | |
| 2009/0256758 | A1 | 10/2009 | Schlub et al. | |
| 2009/0257189 | A1 | 10/2009 | Wang et al. | |
| 2010/0079970 | A1 | 4/2010 | Prest et al. | |
| 2010/0097276 | A1 | 4/2010 | Lin et al. | |
| 2010/0230155 | A1 * | 9/2010 | Hashizume et al. | 174/521 |
| 2012/0250250 | A1 * | 10/2012 | Tatebe | 361/679.55 |

FOREIGN PATENT DOCUMENTS

| CN | 102049838 A | 5/2011 |
| EP | 1918800 A1 | 5/2008 |
| EP | 1919267 A1 | 5/2008 |

OTHER PUBLICATIONS

European Examination Report dated Jul. 18, 2013.
Taiwan Office Action dated Aug. 13, 2014.

* cited by examiner

*Primary Examiner* — Lisa Lea Edmonds
*Assistant Examiner* — Christopher L Augustin
(74) *Attorney, Agent, or Firm* — McClure, Qualey & Rodack, LLP

(57) ABSTRACT

Electronic devices with support frames and mechanically-bonded plastic and methods for forming such electronic devices are provided. A representative electronic device includes: a housing that incorporates: a metal chassis having a base and a sidewall extending outwardly therefrom to define an interior, the chassis having an opening extending there through; a plastic part mechanically bonded to the metal of the chassis, the plastic part spanning the opening; and a support frame mounted at least partially within the housing such that the support frame increases rigidity of the housing.

17 Claims, 4 Drawing Sheets

ELECTRONIC DEVICES WITH SUPPORT FRAMES AND MECHANICALLY-BONDED PLASTIC AND METHODS FOR FORMING SUCH ELECTRONIC DEVICES

TECHNICAL FIELD

The present disclosure generally relates to electronic devices.

BACKGROUND

Various devices such as electronic devices (e.g., smartphones, handheld GPS devices, etc.) trend toward the characteristics of small size and light weight. This is particularly the case with housings of such devices. However, it is difficult to reduce the weight of such devices without reducing desirable mechanical properties, such as resistance to torsional loads.

SUMMARY

Briefly described, one example embodiment, among others, is an electronic device that incorporates a housing, wherein the housing comprises: a metal chassis having a base and a sidewall extending outwardly therefrom to define an interior, the chassis having an opening extending there through; a plastic part mechanically bonded to the metal of the chassis, the plastic part spanning the opening; and a support frame mounted at least partially within the housing such that the support frame increases rigidity of the housing.

Another example embodiment is a method for forming an electronic device comprising: providing a housing formed of a metal chassis and an integrated plastic part, the housing defining an interior; and mounting a support frame at least partially within the interior of the housing such that the support frame spans a width and length of the plastic part and increases rigidity of the housing.

Another example embodiment comprises an electronic device formed by a disclosed method.

Other systems, methods, features and/or advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
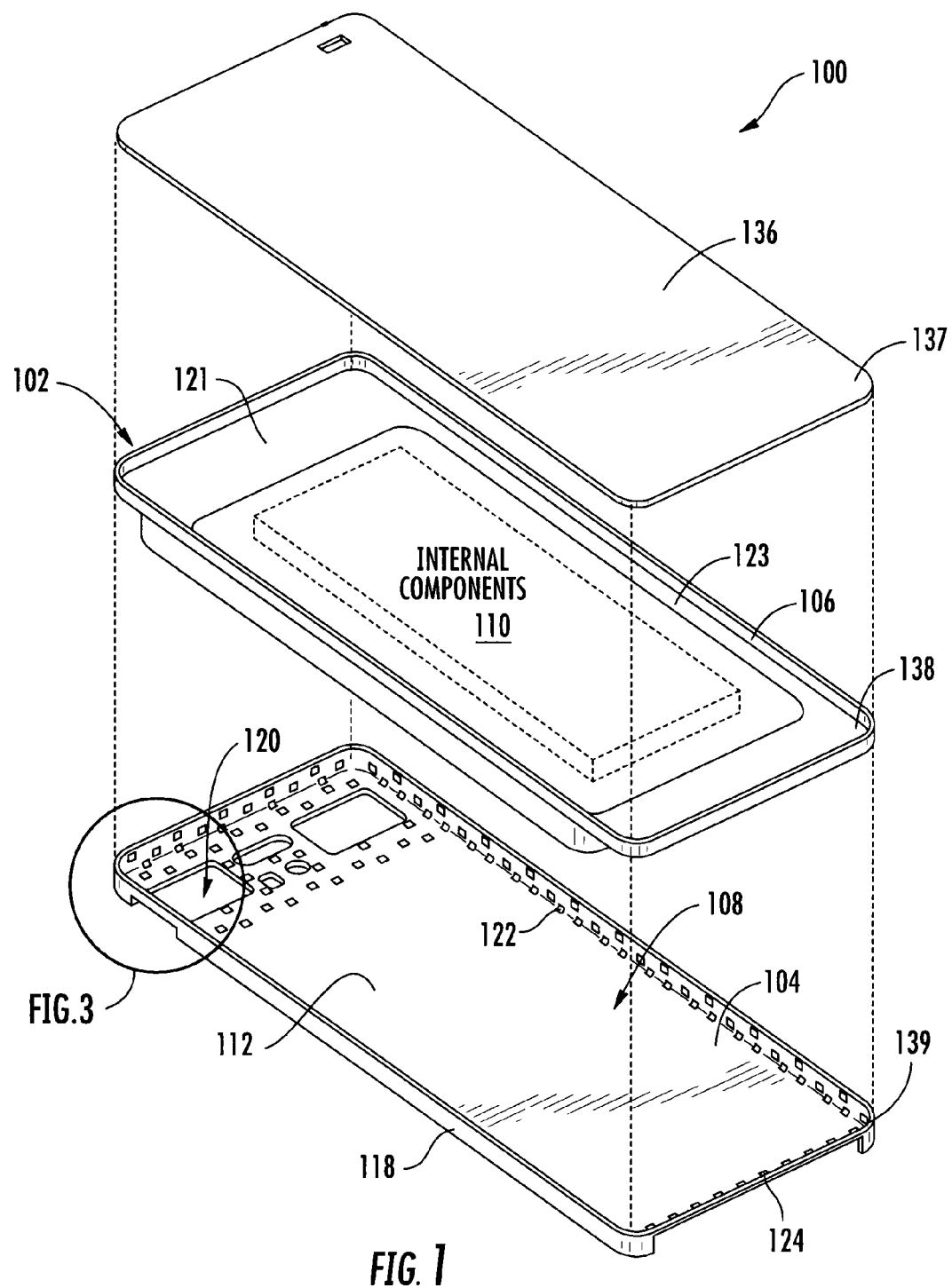
FIG. 1 is a partially-exploded, schematic view of an example embodiment of an electronic device.

Having summarized various aspects of the present disclosure, reference will now be made in detail to that which is illustrated in the drawings. While the disclosure will be described in connection with these drawings, there is no intent to limit the scope of legal protection to the embodiments disclosed herein. Rather, the intent is to cover all alternatives, modifications and equivalents included within the spirit and scope of the disclosure as defined by the appended claims.

Electronic devices with support frames and mechanically-bonded plastic and methods for forming such electronic devices are provided. In some embodiments, recesses are formed in a metal chassis and then the chassis is placed in a mold. Plastic is flowed into the mold and portions of the plastic enter the recesses prior to solidifying. The flow portions of the plastic positioned within the recesses create unexpectedly firm mechanical bonds, thus creating an integrated metal and plastic housing that exhibits light weight. A support frame is mounted to the housing to increase structural rigidity, particularly resistance to bending due to torsion loads. In some embodiments, the support frame spans the length and width of the housing and includes a field that is thinner than a surrounding perimeter of the support frame. Such electronic devices can include mobile devices (e.g., smartphones), tablet computers and accessories, among others.

As shown in FIG. 1, an embodiment of an electronic device 100 includes a housing 102 that incorporates a metal chassis 104 and a plastic part 106. The plastic part is mechanically bonded to the chassis. A representative embodiment of a process for bonding the plastic and metal is described in detail later.

The housing defines an interior 108 in which internal components 110 (the details of which are not described herein) are mounted. The chassis incorporates a base 112 and a sidewall 118, with the sidewall extending outwardly from the base and being positioned about the periphery of the base. Additionally, openings (e.g., opening 120) extend through the chassis. As is known, an opening tends to decrease the structural integrity of the chassis, with the size of the opening generally directly relating to the degree of degradation of mechanical properties.

In order to enhance the structural integrity of the housing, the plastic part is integrated with the metal chassis. Specifically, the plastic part incorporates a body 121 from which various flow portions (e.g., flow portion 152 of FIG. 3) extend. In this case, the body is generally rectangular and includes an aperture 123 for facilitating the placement of internal components 110.

Recesses (e.g., recesses 122, 124) are positioned about the chassis to form bonding locations for the plastic part. In this embodiment, the recesses are formed by chemically etching the recesses into the surface of the chassis using a process known as Nano Molding Technology (NMT). In other embodiments, various other forms of direct metal-to-plastic bonding techniques can be used. For instance, in other embodiments, other methods for forming recesses can be used. Additionally, or alternatively, various adhesion methods, such as selective surface application of adhesive primer on a chassis can be performed prior to introducing plastic into the mold, among others.

The recesses are arranged about various features of the chassis, such as about the openings and the periphery. The recesses form the bonding locations at which the plastic part mechanically bonds to the metal of the chassis. In this embodiment, various ones of the recesses are oriented in opposing relationships. By way of example, there are recesses that face each other across the width of the base.

A support frame 136 is provided that spans the width and length of the chassis to form an even more rigid torque box. This is accomplished by the support frame contacting opposing portions (e.g., opposing portions of the sidewall) of the plastic part. In this embodiment, the support frame exhibits corners (e.g., corner 137), which nest within and contact corresponding corners (e.g., corner 138) of the plastic part, which nest within and contact corresponding corners (e.g., corner 139) of the housing. In other embodiments, various portions of a housing may be shaped to receive a portion of a support frame.

In this embodiment, the support frame is substantially planar and is formed as a continuous piece of metal. In various other embodiments, a support frame can exhibit voids. However, if voids are provided (such as may be used to reduce component weight), the configuration should be such that the support frame preserves a tendency to resist in-plane deformation in order to enhance the rigidity of the housing in which the support frame is mounted.

Figure 2:
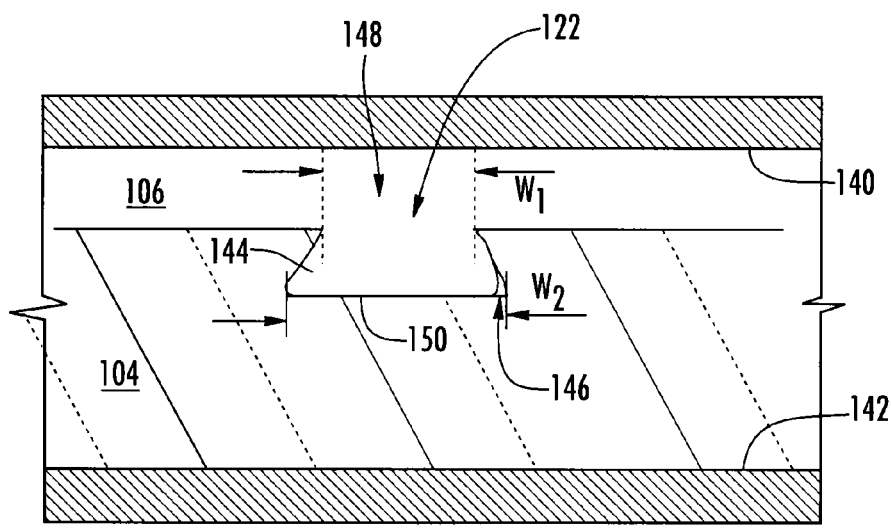
FIG. 2 is a partially cut-away, cross-sectional view of the embodiment of FIG. 1 showing detail of a flow portion of the plastic part and a corresponding recess.

FIG. 2 is a partially cut-away, cross-sectional view of the embodiment of FIG. 1 showing detail of recess 122 in an assembled configuration. As shown in FIG. 2, the housing is positioned within a mold that includes mold surfaces 140, 142. Plastic is flowed into the mold and a flow portion 144 of the plastic part enters the recess where it is permitted to harden. Preferably, a viscosity of the plastic is selected to enable the plastic to completely fill the recess although some voids (e.g., void 146) may be present.

In this embodiment, the recesses exhibit necked regions that essentially form interference fits with respective flow portions of the plastic part. For instance, recess 122 exhibits a width that varies with respect to its depth to form a necked region 148 with a width ($w_1$) that is narrower than the width ($w_2$) of base 150. Various other dimensions of a recess that may or may not include a necked region can be used in other embodiments.

Figure 3:
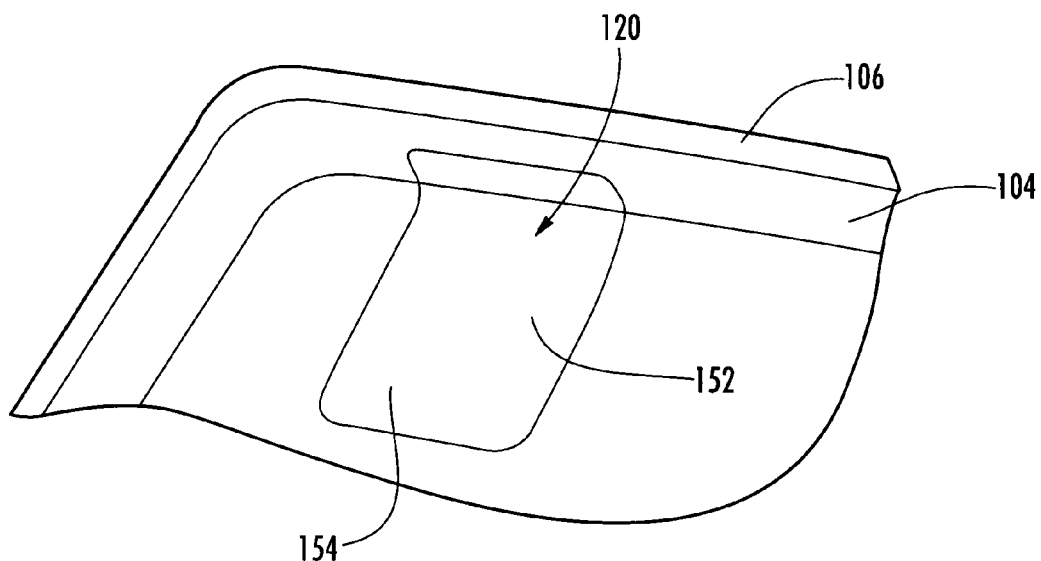
FIG. 3 is a partially cut-away view of the embodiment of FIG. 1 showing detail of an exposed surface of the plastic part.

FIG. 3 is a partially cut-away view of the embodiment of FIG. 1 showing detail of an exposed surface of plastic part 106. Specifically, shown in FIG. 3 is a portion of the chassis with a flow portion 152 of the plastic part filling opening 120 of the chassis. Note that the exposed surface 154 of the plastic part is flush with the surrounding surface of the chassis and that the periphery of the plastic flow portion conforms to the aperture that defines opening 120.

Figure 4:
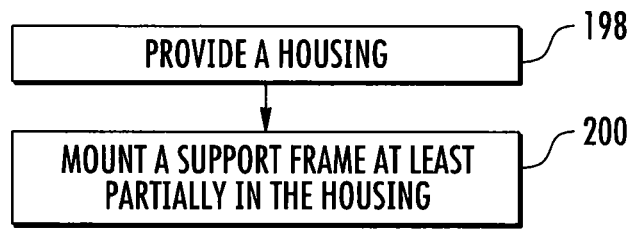
FIG. 4 is a flowchart depicting an example embodiment of a method for forming an electronic device.

FIG. 4 is a flowchart depicting an exemplary embodiment of a method for forming an electronic device. As shown in FIG. 4, the method includes: providing a housing formed of a metal chassis and an integrated plastic part, the housing defining an interior (block 198); and mounting a support frame at least partially within the interior of the housing such that the support frame spans a width and length of the plastic part and increases rigidity of the housing (block 200).

Figure 5:
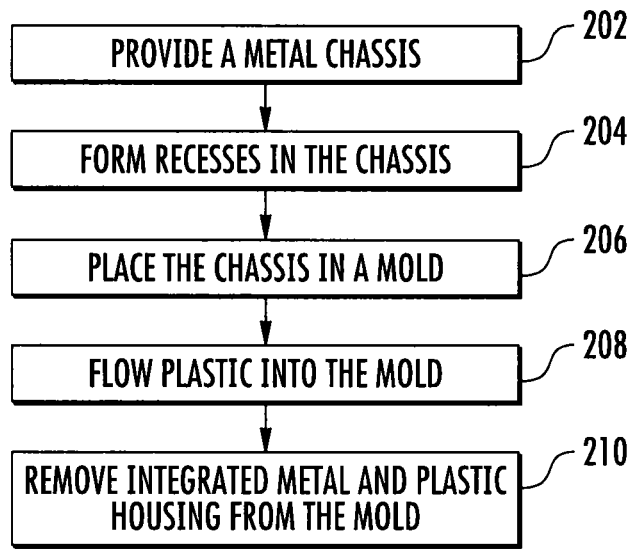
FIG. 5 is a flowchart depicting an example embodiment of a method for forming an electronic device.

FIG. 5 is a flowchart depicting an exemplary embodiment of a method; specifically, example steps that can be used to provide a housing. As shown in FIG. 5, the method includes: providing a metal chassis with an opening extending there through (block 202); forming recesses in the chassis, with at least some of the recesses being positioned about the opening (block 204); and placing the chassis in a mold (block 206). Thereafter, such as depicted in block 208, plastic is flowed into the mold (e.g., injected) so that the plastic flows into the recesses and the opening to form an integrated metal and plastic housing. Notably, the plastic is mechanically bonded to the metal of the chassis via flow portions formed within the recesses. In block 210, the integrated metal and plastic housing is removed from the mold.

Figure 6:
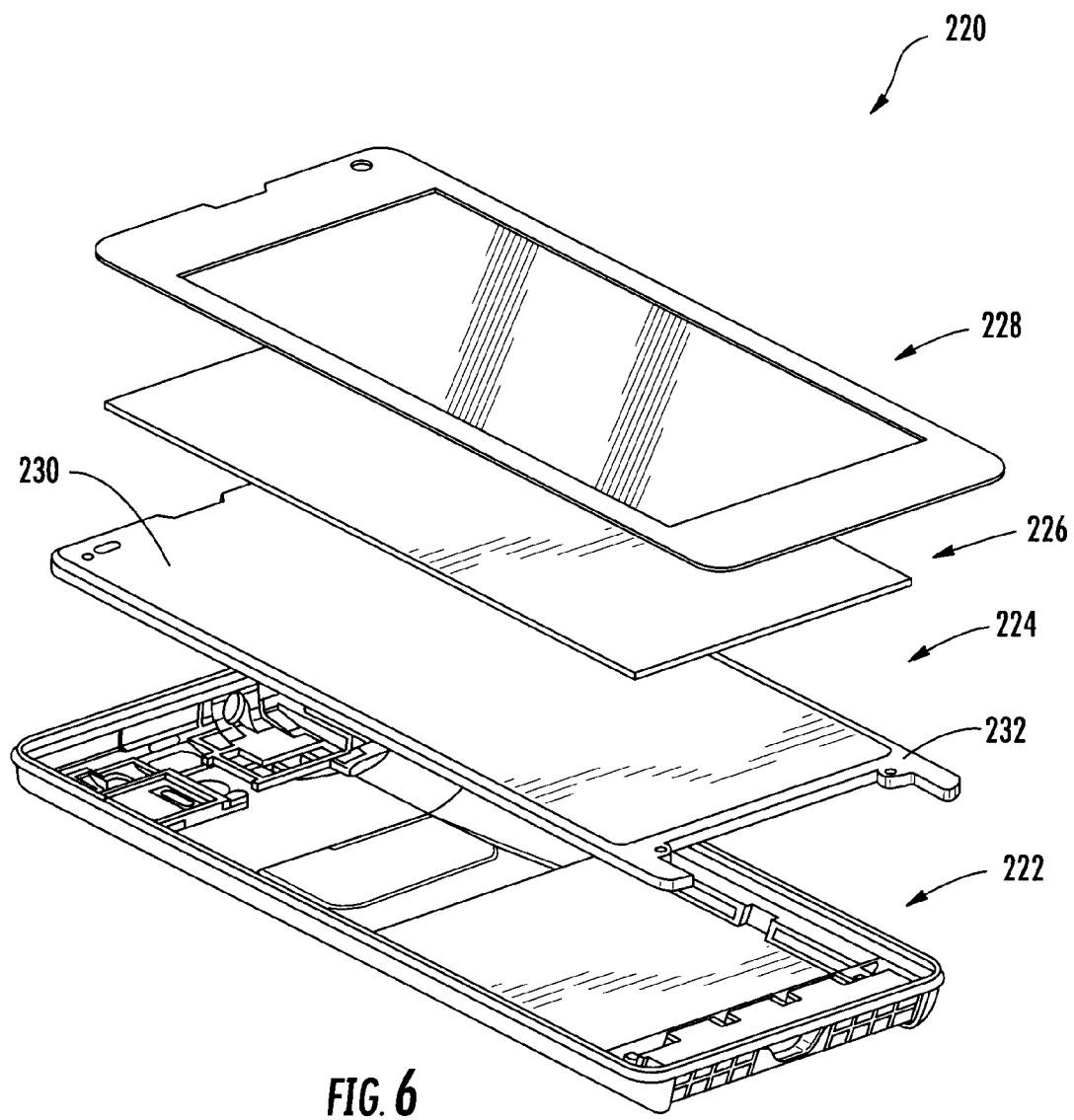
FIG. 6 is a partially exploded, schematic view of another example embodiment.

FIG. 6 is a partially exploded, schematic view of another exemplary embodiment of an electronic device. As shown in FIG. 6, electronic device 220 includes a housing 222 that incorporates an integrated metal chassis and plastic part. The electronic device also includes a support frame 224, a liquid crystal display (LCD) module 226 and a transparent cover (e.g., a glass cover) 228. Notably, the various components are stacked in an overlying relationship such that the LCD module is positioned between the cover and the support frame, and the support frame is positioned between the LCD module and the base of the housing.

In the embodiment of FIG. 6, the support frame is a formed of metal and exhibits a field 230 and a perimeter 232 surrounding the field. Notably, the material thickness at the perimeter is thicker than that of the field. By way of example, the field portion can exhibit a thickness of less than approximately 0.3 mm (e.g., 0.2 mm), and the perimeter can exhibit a thickness of less than approximately 1.8 mm (e.g., 1.6 mm). As such, a support frame with an overall thickness of less than approximately 2 mm is provided in some embodiments.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An electronic device comprising:
   a housing comprising:
      a metal chassis having a base and a sidewall extending outwardly therefrom to define an interior, the metal chassis having an opening extending through the metal chassis, the metal chassis having first recesses positioned about the opening on the base and second recesses positioned about the opening on the sidewall; and
      a plastic part mechanically bonded to the first recesses on the base of the metal chassis and the second recesses on the sidewall of the metal chassis such that a torque box is formed to stiffen the metal chassis, the plastic part spanning and filling the opening; and
   a support frame mounted at least partially within the housing such that the support frame increases rigidity of the housing by the support frame spanning a width and length of the plastic part.

2. The electronic device of claim 1, wherein
   the plastic part is mechanically bonded to the metal chassis via first flow portions of the plastic part being positioned within the first recesses and the second recesses.

3. The electronic device of claim 1, wherein:
   the support frame has a field and a perimeter edge surrounding the field; and
   the perimeter is thicker than the field.

4. The electronic device of claim 1, wherein the support frame is a metal support frame.

5. The electronic device of claim 1, wherein the support frame is mounted to the plastic part.

6. The electronic device of claim 4, wherein:
   the plastic part has a sidewall mechanically bonded to the sidewall of the metal chassis; and the support frame contacts opposing portions of the sidewall of the plastic part.

7. The electronic device of claim 1, further comprising a liquid crystal display (LCD) module mounted to the chassis.

8. The electronic device of claim 7, wherein the support frame is positioned, at least partially, between the base of the metal chassis and the LCD module.

9. The electronic device of claim 1, wherein:
the housing exhibits interior corners; and
the support frame exhibits corners such that the corners of the support frame contact corresponding corners of the housing.

10. The electronic device of claim 1, wherein the electronic device is a smartphone.

11. The electronic device of claim 1, wherein:
the device further comprises an LCD module and a cover; and
the support frame and the LCD module are positioned between the base of the housing and the cover.

12. A method for forming an electronic device comprising:
providing a metal chassis, having a base and a sidewall extending outwardly therefrom to define the interior;
forming an opening extending through the metal chassis forming recesses in the metal chassis;
placing the metal chassis in a mold;
flowing plastic into the mold such that the plastic flows into the recesses and the opening to form a housing having a plastic part mechanically bonded to the metal chassis via flow portions formed within the recesses and the opening; and
mounting a support frame at least partially within the interior of the housing such that the support frame spans a width and length of the plastic part and increases rigidity of the housing.

13. The method of claim 12, further comprising forming the support frame to a thickness of less than 2 mm.

14. The method according to claim 12, wherein mounting the support frame further comprises forming a torque box for resisting bending with the metal chassis, the plastic part and the support frame.

15. The method of claim 12, further comprising mounting an LCD module to the housing such that the support frame is positioned, at least partially, between the metal chassis and the LCD module.

16. The method of claim 15, wherein the recesses are positioned about the opening.

17. A component formed by the method of claim 12.

* * * * *